(No Model.)

E. G. D. DEVILLE.
SCREEN FOR PHOTOMECHANICAL PRINTING PROCESSES.

No. 551,266.  Patented Dec. 10, 1895.

WITNESSES.

INVENTOR:
E. G. D. Deville
BY Munn & Co
ATTORNEYS

UNITED STATES PATENT OFFICE.

EDOUARD G. D. DEVILLE, OF OTTAWA, CANADA.

SCREEN FOR PHOTOMECHANICAL-PRINTING PROCESSES.

SPECIFICATION forming part of Letters Patent No. 551,266, dated December 10, 1895.

Application filed May 17, 1895. Serial No. 549,712. (No model.)

*To all whom it may concern:*

Be it known that I, EDOUARD GASTON DANIEL DEVILLE, of Ottawa, in the Province of Ontario and Dominion of Canada, have invented new and useful Improvements in Screens for Photomechanical Processes, of which the following is a full, clear, and exact description.

The object of my invention is to provide a new kind of screen, for use in those photomechanical processes where a screen is placed in front of a photographic plate for the purpose of changing the continuous tones of an original into tones formed of white and black dots.

My invention consists in a screen furnished with alternate opaque and transparent squares, disposed like the squares of a chess-board.

Reference is to be had to the accompanying drawings, forming a part of this specification, in which similar characters of reference indicate corresponding parts in all the views.

Figure 1:
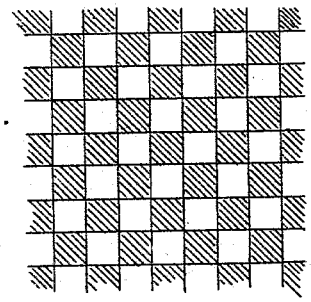
Figure 3:
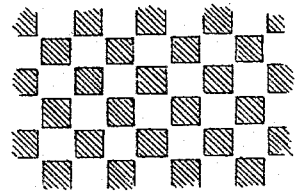
Figure 2:
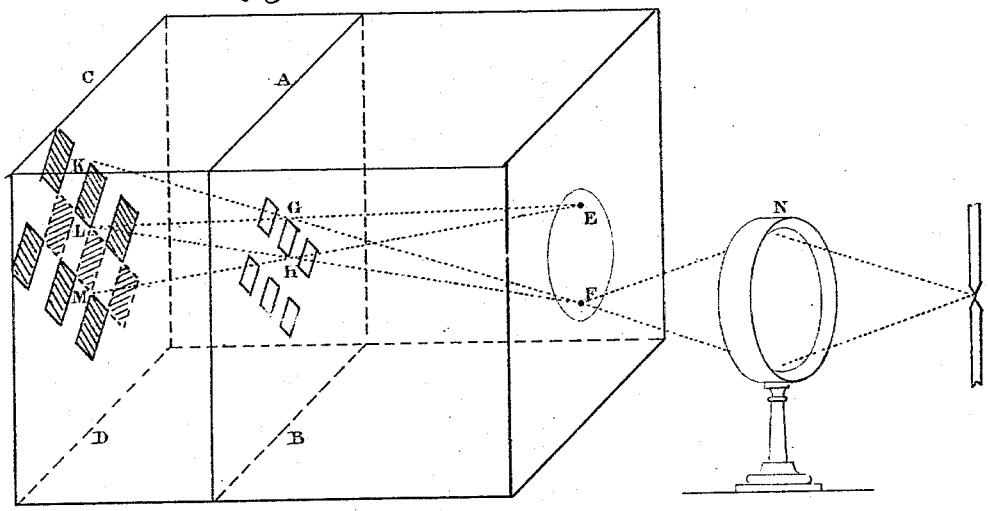

Figure 1 is a face view of my improved screen, enlarged. Fig. 2 is a perspective view of a camera, showing the manner of making the screen; and Fig. 3 is a face view of a modified form of my improved screen, enlarged.

The chess-board screen produces twice as many dots on the print as the cross-lined screen from which it is made. A coarser screen must, therefore, be used to produce the same effect. For instance, a chess-board screen made from plates ruled ninety lines to the inch gives the same fineness of grain as a cross-lined screen ruled one hundred and thirty lines to the inch. The black and white squares forming the middle tone of the print are parallel to the squares of the screen. They are not turned around forty-five degrees as with the cross-lined screen.

I make this screen from a cross-lined screen ruled so that the thickness of the dark and transparent lines is as nearly equal as possible, the transparent squares covering one-quarter of the surface of the screen.

I take a long extension-camera and place the cross-lined screen in A B, Fig. 2, in front of and close to a photographic sensitive-plate C D. Instead of a photographic lens I use a metal plate with two very minute holes E and F. On one of these holes—F, for instance—I form by means of a condenser N the image of a powerful source of light, like the sun or an electric-arc light. The condenser must be perfectly clean and free from defects and scratches. It may be a photographic lens of large aperture. The screen projects a shadow over the plate, the only parts illuminated being squares similar to those of the screen. (Shown in full lines on the figure.) If the plate were now developed, it would show opaque squares corresponding to the transparent squares of the screen, with transparent lines between; but before doing so I bring the image of the source of light, by moving the condenser on the hole E, and give a second exposure equal to the first one. The screen now casts another shadow on the plate, which will cause another set of opaque squares after development. If the line joining E and F is parallel to one of the diagonals of the squares, and if the distance of the two holes is properly adjusted, the transparent square G H of the screen, which, with the first exposure, produced the opaque square L K on the plate, now produces another opaque square in L M. Each of the squares of the screen producing the same effect, the plate shows, after development, alternate opaque and transparent squares like the squares of a chess-board, as shown in Fig. 1.

Designating by $d$ the distance from the screen to the plate, by $n$ the number of lines of the screen to the inch, and by P the distance from the photographic plate to the diaphragm, the distance between the two holes E and F must be $\dfrac{P}{d\,n\,\sqrt{2}}$. If, for instance, the screen is ruled ninety lines to the inch and placed one-fourth inch in front of the plate and the diaphragm one hundred inches from it, the distance of the holes must be 3.13 inches.

Instead of a cross-lined screen with transparent and dark lines of equal width, I may employ one in which the opaque lines are wider than the transparent lines. The opaque squares produced on the photographic plate do not then quite join, and the resulting screen consists of isolated opaque squares disposed in alternate order on a transparent ground, as shown in Fig. 3. I may also use a cross-lined screen in which the transparent lines are wider than the opaque lines. The opaque squares then formed on the photographic plate overlap, and the screen produced consists of alternate transparent squares on an opaque ground.

This process may be employed for simply copying screens by giving the exposure through a single aperture, or it may be employed by combining the shadows cast by exposure through various holes suitably disposed to produce screens consisting of minute geometrical patterns of various kinds.

Having thus described my invention, I claim as new and desire to secure by Letters Patent—

1. A photo mechanical screen for changing the continuous tones of an original into tones formed of white and black dots, the said screen consisting of alternate opaque and transparent squares disposed like the squares of a chess board, substantially as specified.

2. A screen for photo mechanical purposes the same consisting of a transparent ground having alternate isolated opaque squares disposed in chess board order thereon, the said opaque squares having their corners adjacent whereby the transparent ground is practically divided into squares alternating with the opaque squares substantially as specified.

EDOUARD G. D. DEVILLE.

Witnesses:
M. BRADY,
RICH. H. HUNTER.